United States Patent

Mine

[11] Patent Number: 5,966,358
[45] Date of Patent: Oct. 12, 1999

[54] SIGNAL RECORDING APPARATUS AND SIGNAL RECORDING METHOD

[75] Inventor: Norichika Mine, Kanagawa, Japan

[73] Assignee: Sony Corporation, Tokyo, Japan

[21] Appl. No.: 08/951,807

[22] Filed: Oct. 16, 1997

[30] Foreign Application Priority Data

Oct. 18, 1996 [JP] Japan ................. P08-276500

[51] Int. Cl.⁶ .................................. G11B 7/00
[52] U.S. Cl. .................. 369/58; 369/59; 369/47
[58] Field of Search ..................... 369/47, 48, 49, 369/50, 54, 58, 59, 60, 32, 124; 360/68, 53, 39

[56] References Cited

U.S. PATENT DOCUMENTS

| | | | |
|---|---|---|---|
| 4,926,272 | 5/1990 | Takamatsu et al. | 360/49 |
| 5,075,804 | 12/1991 | Deyring | 369/54 X |
| 5,237,553 | 8/1993 | Fukushima et al. | 369/58 |
| 5,258,852 | 11/1993 | Kamijima | 358/335 |
| 5,859,823 | 1/1999 | Yamamuro | 369/58 |
| 5,883,867 | 3/1999 | Yamamuro | 369/59 X |

FOREIGN PATENT DOCUMENTS

0383298 A2  8/1990  European Pat. Off. .
0559468 A2  9/1993  European Pat. Off. .

*Primary Examiner*—Muhammad Edun
*Attorney, Agent, or Firm*—Limbach & Limbach L.L.P.

[57] ABSTRACT

A signal recording apparatus and a signal recording method for recording moving pictures, such as, a movie, without certifying an optical disc recording medium are provided. A recording section 10 of a signal recording apparatus 1 records moving picture data onto an optical disc. A defective sector detection circuit 31 reads, from the recording medium, a physical block address corresponding to the logical block address of the moving picture data to be recorded and detects an address error. When the address error is detected, an address control circuit 32 stops read counting from an RSPC working memory 14. When the defective sector detection circuit 31 detects a sector of the next good physical block address after detecting the address error, the defective sector detection circuit 31 supplies a restart signal to the address control circuit 32 so that recording starts at this good sector. A random access memory 24 stores physical block addresses of defective sectors, and records a list of the physical block addresses of the defective sectors onto the recording medium after all the moving picture data are recorded.

4 Claims, 3 Drawing Sheets

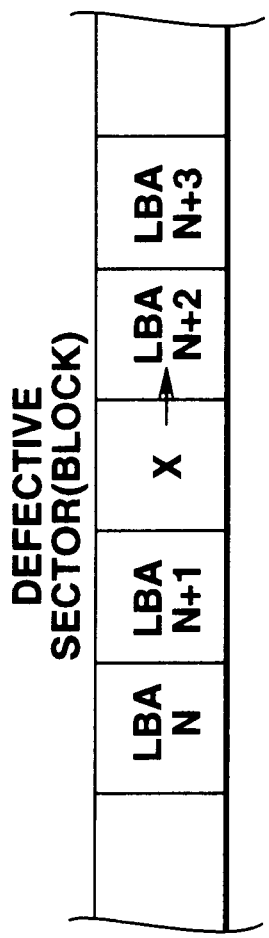
FIG.1A SLIPPING
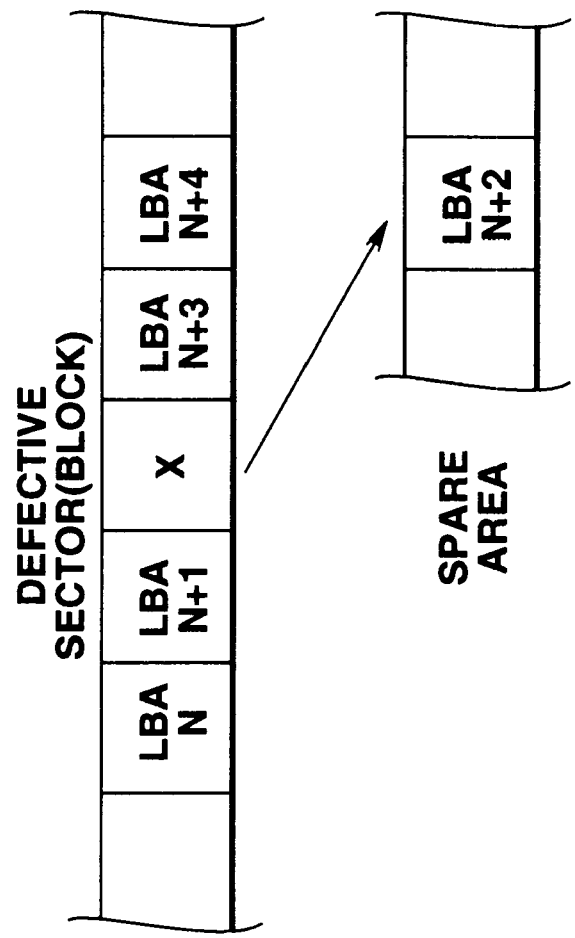
FIG.1B LINEAR REPLACEMENT

SIGNAL RECORDING APPARATUS AND SIGNAL RECORDING METHOD

BACKGROUND OF THE INVENTION

1. Field of the Invention

This invention relates to a signal recording apparatus and a signal recording method for recording data onto a recording medium, such as, an optical disc, and particularly to a signal recording apparatus and a signal recording method fro recording sequential data, such as, moving pictures.

2. Description of the Related Art

As a large-capacity recording medium having a recording capacity exceeding several gigabyte units, an optical disc recording medium for reproduction only which handles sequential data of moving pictures, such as, a movie, has been employed. Also, as a large-capacity recording medium having a recording medium capacity exceeding several gigabyte units, an optical disc recording medium for recording and reproduction which is capable of handling computer data is expected to appear. Upon appearance of such large-capacity optical disc recording medium capable of recording and reproduction, it is considered to record sequential data like moving pictures which have been conventionally recorded on video tapes, onto a recording medium assumed to record computer data and allow random access.

Therefore, it is also considered to reproduce a large-capacity optical disc recording medium capable of recording and reproduction by using a reproducing apparatus for reproduction only which reproduces a reproduction-only optical disc recording medium having large-capacity data like a movie recorded thereon, or to reproduce a large-capacity optical disc recording medium for movie reproduction only by using a recording/reproducing apparatus for recording on and reproducing from the large-capacity optical disc recording medium capable of recording and reproduction. Thus, in order to have compatibility with the recording medium assumed to allow random access, the recording medium handling sequential data like moving pictures of a movie also need to record the sequential data in the same format.

Meanwhile, with respect to the recording format of the recording medium, such as, an optical disc, a defective sector alternate processing technique is used in general. This alternate processing is such processing that when a defect is generated in a part of the recording medium to disturb recording of data onto the recording medium or reproduction of data from the recording medium, the recording area is alternated to another part of the recording medium to record data without recording data in the defective part.

Specifically, this defective sector alternate processing is classified into slipping processing using certifying processing which is performed in initializing the recording medium and processing by linear replacement which is performed in use.

The alternate processing of the defective sector by the slipping processing is performed as follows. First, certifying processing is carried out to determined the logical block address (LBA) corresponding to the physical block address. In this certifying processing, whether each sector of the recording medium has any defect or not is checked by carrying out recording/reproduction of data. If it is confirmed that the sector has no defect as a result of the check, the logical block address corresponding to the physical block address of this sector is determined. On the contrary, if the recorded data cannot be read out correctly and it is thus confirmed that the sector has a defect as a result of the check, slipping processing is performed to determine the logical block address from the defect-free sector immediately after the defective sector without determining the logical block address for this defective sector, as shown in FIG. 1A. Then, the physical block address of the defective sector is recorded on a primary defect list (hereinafter referred to as PDL) in a management area of the recording medium. Therefore, in the defective sector alternate processing by slipping processing using the certifying processing, it suffices only to skip the defective sector when accessing sectors before and after the defective sector to record and reproduce data thereof for slipping processing. Thus, performance is not significantly deteriorated.

On the other hand, the alternate processing by linear replacement in use is performed as follows. When a defective sector is found during writing of data onto the recording medium, the data to be recorded in the defective sector is recorded in an alternate sector in a spare area of the recording medium, as shown in FIG. 1B. In this alternate sector, the logical block address of the defective sector in which writing could not carried out is appended. The physical block address of the defective sector and the physical block address of the alternate sector are recorded on a secondary defect list (hereinafter referred to as SDL) in the management area of the recording medium. Therefore, in the alternate processing by linear replacement, seek and rotational delay are made for accessing the alternate sector of the defective sector in accessing sectors before and after the defective sector to record and reproduce data thereof. Thus, performance is significantly deteriorated. For this reason, recording/reproduction of moving pictures on the real-time basis is not suitable for this processing.

In order to have compatibility between the reproduction-only optical disc recording medium which handles sequential data of moving pictures, such as, a movie, as the large-capacity recording medium having a recording medium exceeding several gigabyte units, and the expected optical disc recording medium for recording/reproduction which is capable of handling computer data as the large-capacity recording medium having a recording capacity exceeding several gigabyte units, the data formats must be made common by processing including the above-described alternate processing.

However, with the optical disc for recording and reproduction which is capable of handling computer data as the large-capacity recording medium having a recording capacity exceeding several gigabyte units, certifying processing is time-consuming. For example, with an optical disc having a recording capacity exceeding five gigabytes, the time required for certifying processing exceeds one hour. Therefore, the user of this optical disc recording medium for recording and reproduction must perform certifying processing as pre-processing for recording even for the purpose of recording a movie as if using a video tape, and must take as long as one hour for pre-processing for recording a movie.

Thus, the above-described large-capacity optical disc recording medium assumed to be certified is not practical as a commercial product. Although it is possible to certify the large-capacity optical disc recording medium at the time of shipment, taking one hour leads to significant deterioration in productivity and increase in cost. Therefore, this is not practical, either.

On the other hand, in the case where linear replacement is used for the above-described alternate processing, since seek and rotational delay are made for accessing the alternate sector of the defective sector, performance is significantly deteriorated. Therefore, the processing speed is low in recording and reproduction on the real-time basis. This processing cannot be used for, for example, recording or reproduction of moving pictures, such as, a movie, on the real-time basis.

In view of the foregoing status of the art, it is an object of the present invention to provide a signal recording apparatus and a signal recording method such that in the case where sequential data, such as, moving pictures, are to be recorded on an optical disc recording medium for recording and reproduction which is capable of handling computer data as a large-capacity recording medium having a recording capacity exceeding several gigabyte units, recording is carried out without certifying the recording medium, and such that the sequential data, such as, moving pictures, are recorded and reproduced on the real-time basis.

SUMMARY OF THE INVENTION

According to the present invention, there is provided a signal recording apparatus for recording sequential data, in which alternate processing of a defective sector is performed by slipping processing without performing certifying processing.

Specifically, the signal recording apparatus according to the present invention is adapted for recording sequential data onto a recording medium having a data recording area divided into sectors of predetermined recording units with each sector provided with a physical block address and a management area for managing recorded data. The signal recording apparatus includes: recording means for dividing the sequential data into units corresponding to the sectors, providing the units with logical block addresses, and recording one unit provided with the logical block address onto the sector of the corresponding physical block address; defective sector detection means for reading out the logical block address of the one unit recorded on the recording medium after the one unit of the sequential data is recorded by the recording means, judging whether or not the read logical block address is equal to the recorded logical block address, and detecting whether or not the sector having the one unit recorded thereon is a defective sector; address control means for controlling the recording means to record a unit of a new logical block address onto a sector of the next physical block address when no defective sector is detected by the defective sector detection means, and for controlling the recording means to re-record the unit of the logical block address recorded in the defective sector onto the sector of the next physical block address when the defective sector is detected; storage means for storing the physical block address of the defective sector when the defective sector is detected by the defective sector detection means; and address recording means for recording the physical block address of the defective sector stored in the storage means into the management area of the recording medium after all the sequential data are recorded onto the recording medium to complete recording.

According to the present invention, there is also provided a signal recording method for recording sequential data, in which alternate processing of a defective sector is performed by slipping processing without performing certifying processing.

Specifically, the signal recording method according to the present invention is adapted for recording sequential data onto a recording medium having a data recording area divided into sectors of predetermined recording units with each sector provided with a physical block address and a management area for managing recorded data. The signal recording method includes the steps of: dividing the sequential data into units corresponding to the sectors, providing the units with logical block addresses, recording one unit provided with the logical block address onto the sector of the corresponding physical block address, reading out the logical block address of the one unit recorded on the recording medium, judging whether or not the read logical block address is equal to the recorded logical block address, and detecting whether or not the sector having the one unit recorded thereon is a defective sector; recording a unit of a new logical block address onto a sector of the next physical block address to continue recording the sequential data when the sector having the one unit recorded thereon is not a defective sector, and for re-recording the unit of the logical block address recorded in the defective sector onto the sector of the next physical block address to continue recording the sequential data when the sector having the one unit recorded thereon is the defective sector; and storing the physical block address of the defective sector when the sector having the one unit recorded thereon is the defective sector, and recording the physical block address of the defective sector stored in the storage means into the management area of the recording medium after all the sequential data are recorded onto the recording medium to complete recording.

BRIEF DESCRIPTION OF THE DRAWINGS

FIGS. 1A and 1B illustrate alternate processing of a defective sector.

DETAILED DESCRIPTION OF THE INVENTION

Figure 2:
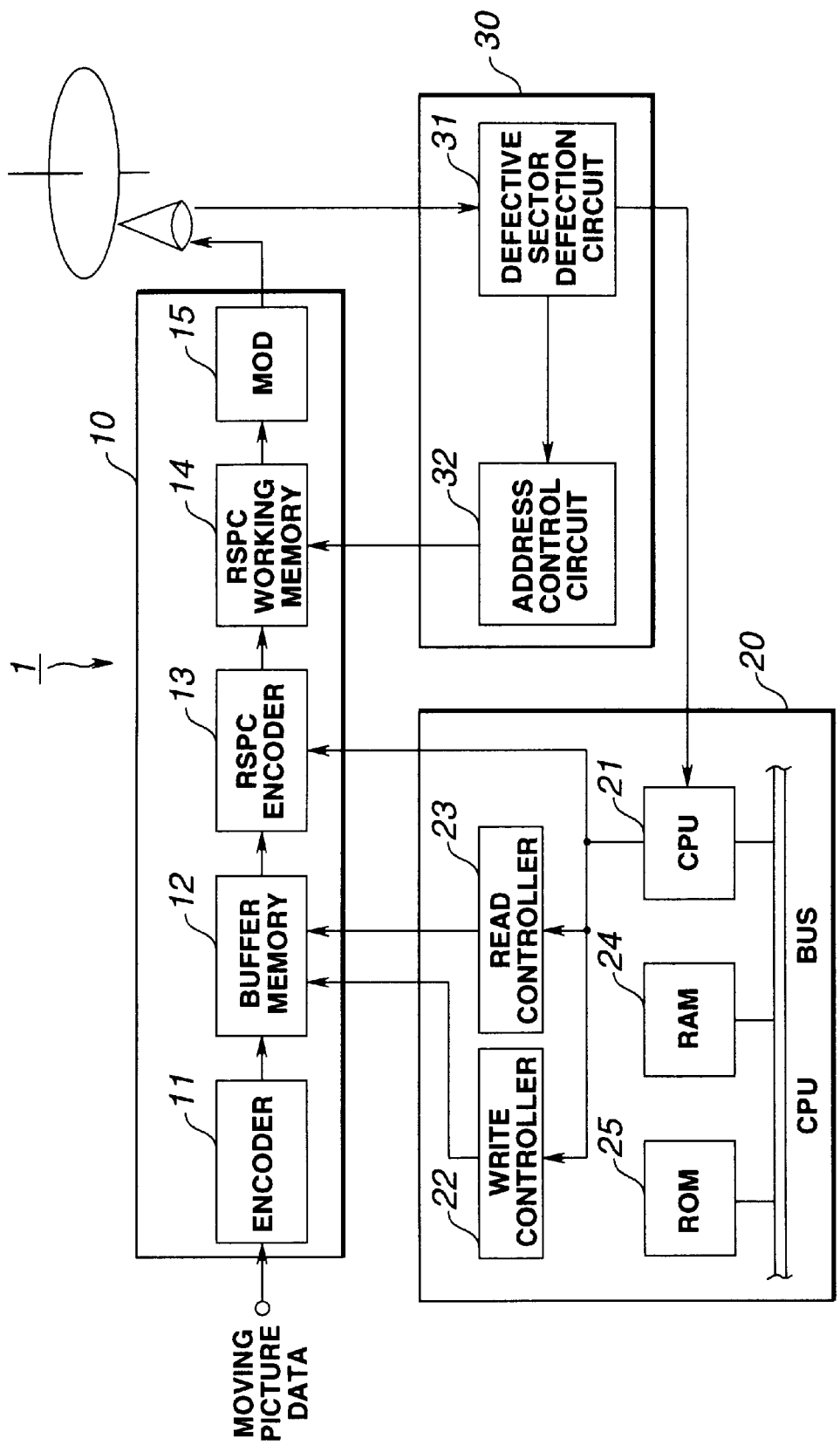
FIG. 2 is a block diagram showing the structure of a moving picture recording apparatus according to the present invention.
Figure 3:
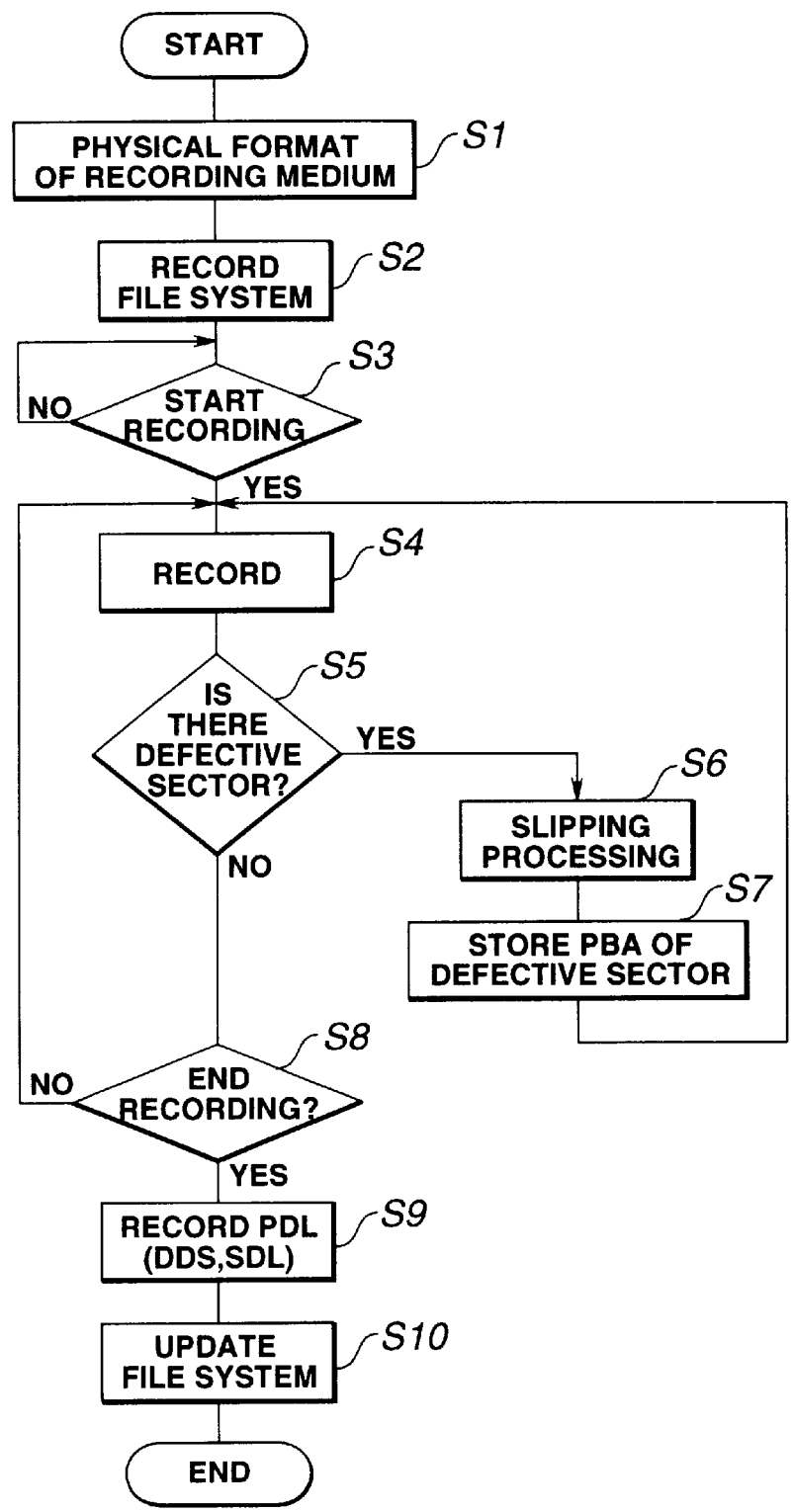
FIG. 3 is a flowchart for explaining a recording method for recording moving picture data by slipping processing in the moving picture recording apparatus according to the present invention.

A preferred embodiment of the present invention will now be described in detail with reference to the drawings. The signal recording apparatus according to the present invention may be realized as a moving picture recording apparatus as shown in FIG. 2.

A moving picture recording apparatus 1 according to the present invention is a signal recording apparatus for recording moving picture data as sequential data onto an optical disc recording medium (hereinafter referred to simply as a recording medium) for recording and reproduction which is capable of handling computer data as a large-capacity recording medium having a recording capacity exceeding several gigabyte units, such as, a digital video disc—random access memory (DVD-RAM).

Also, the moving picture recording apparatus 1 according to the present invention is a signal recording apparatus which detects a defective sector of the recording medium in recording moving picture data, then skips the defective sector, if detected, and records data onto the next defect-free sector.

In this case, the sector is a recording unit of data on the recording medium. Each sector is provided with a physical block address. The defective sector is a sector which has an error for any reason and hence does not allow accurate reproduction of data even though data is written thereon.

The error generated in this defective sector may be an address defect such that the physical block address of the sector having the data recorded thereon cannot be read out, or an uncorrectable error such that the data cannot be corrected by an error correction code (ECC), that is, the case of ECC uncorrectable. The address defect is more problematical, and most of errors which are generally detected are such address defects. In addition, since the format of this recording medium employs a very effective error correction code (Read Sollmon Product Code or RSPC), it is considered that there are only few cases where the data cannot be corrected by the ECC. Even if the data cannot be corrected by the ECC, hold processing may be performed to deal with this situation for the moving picture data, unlike computer data.

The moving picture recording apparatus 1 according to the present invention includes a recording section 10 for recording moving picture data onto a recording medium, a control section 20 for controlling the operation of the recording section 10, and an address control section 30 for controlling the physical block address and the like of the recording medium in recording the moving picture data.

The recording section 10 includes an encoder 11, a buffer memory 12, an RSPC encoder 13, an RSPC working memory 14, and a modulator 15. Moving picture data, such as, a movie, is inputted to the encoder 11. The moving picture data is digital data of moving pictures supplied from an external tuner outside of the moving picture recording apparatus 1 or a video camera. The encoder 11 compresses this moving picture data by the Moving Picture Experts Group 2 (MPEG2) standard. The moving picture data compressed by the encoder 11 is supplied to the buffer memory 12.

The buffer memory 12 temporarily stores therein the moving picture data compressed by the encoder 11, and supplies the moving picture data to the RSPC encoder 13 in accordance with a recording rate to the recording medium. At this point, the timing for writing data into the buffer memory 12 is controlled by a write controller 22 as later described. The timing for reading data from the buffer memory 12 is controlled by a read controller 23 as later described.

The RSPC encoder 13 appends an error correction parity based on RSPC to the picture data supplied from the buffer memory 12 under the control of a central processing unit 21 as later described. This appending of the error correction parity is performed on the RSPC working memory 14 on predetermined block basis. In addition to error correction processing, the RSPC encoder 13 also appends a data ID field as a logical block address on the RSPC working memory 14.

The moving picture data recorded in the RSPC working memory 14 is supplied through the modulator 15 and is recorded at the physical block address of the recording medium corresponding to the logical block address appended by the RSPC encoder. At this point, the moving picture data read out from the RSPC working memory 14 and recorded onto the recording medium is controlled by an address control circuit 32 as later described. The address control circuit 32 controls counting of the read address of the RSPC working memory 14 and recording of the moving picture data of the counted logical block address onto the sector of the corresponding physical block address on the recording medium.

The control section 20 includes the central processing unit 21, the write controller 22, the read controller 23, a random access memory (RAM) 24 which is a semiconductor memory, and a read only memory (ROM) 25 which is similarly a semiconductor memory. The central processing unit 21 controls the write controller 22 and the read controller 23. The write controller 22 and the read controller 23 control the timing for writing and the timing for reading, respectively, of the data stored in the buffer memory 12 under the control of the central processing unit 21.

The central processing unit 21 also controls appending of the error correction parity and appending of the data ID field as the logical block address performed by the RSPC encoder 13.

The random access memory 24 is a semiconductor memory capable of writing and reading data. This random access memory 24 is connected to the central processing unit 21 via a CPU bus, and stores the physical block address of the defective sector supplied to the central processing unit 21 from a defective sector detection circuit 31 as later described.

The read only memory 25 is a semiconductor memory for read-out only, and stores a control program and the like of the central processing unit 21.

The address control section 30 includes the defective sector detection circuit 31 and the address control circuit 32.

The defective sector detection circuit 31 detects the physical block address at the leading part of each sector of the recording medium. The defective sector detection circuit 31 detects an address defect from the detected physical block addresses, and supplies an interrupt signal for the recording operation to the address control circuit 32 if the address defect is detected. On receiving the interrupt signal for the recording operation from the defective sector detection circuit 31, the address control circuit 32 stops counting the read address of the data read out from the RSPC working memory 14.

When the defective sector detection circuit 31 detects a sector of the next good physical block address after detecting the address defect, the defective sector detection circuit 31 supplies a restart signal to the address control circuit 32. On receiving the restart signal, the address control circuit 32 restarts counting the read address of the moving picture data read out from the RSPC working memory 14. Then, the defective sector detection circuit 31 supplies the physical block address of the defective sector to the central processing unit 21, and the random access memory 24 stores this physical block address.

When the defective sector detection circuit 31 detects the address defect, the defective sector detection circuit 31 may perform the operation to continue recording the moving picture data as dummy data on the defective sector having the address defect without stopping counting of the read address, instead of performing the operation to stop counting the read address of the RSPC working memory 14. In this case, when the next good address is detected, the address must be returned to the logical block address of the moving picture data recorded as dummy data on the defective sector so as to restart recording.

In detecting the sector of the next good physical block address to restart recording data after the address defect is detected, the data ID field as the logical block address may change. In this case, the sector of the next good address is detected once, and re-encoding is performed by the RSPC encoder 13. Therefore, in recording onto the recording medium, rotational delay of one turn is generated. However, since it only accompanies seek of jump for about one track, deterioration in performance is absorbed by the buffer memory 12 and does not affect the recording of moving pictures on the real-time basis.

Next, a recording method for the moving picture recording apparatus 1 to record moving picture data onto a recording medium while detecting a defective sector on the recording medium and performing slipping processing will be described with reference to the flowchart of FIG. 2.

The moving picture recording apparatus 1 is started to operate as the user of the moving picture recording apparatus 1 supplies the moving picture data thereto from an external tuner or a video camera.

At step S1, a recording medium is set on the moving picture recording apparatus 1 and the recording medium is physically formatted. The moving picture recording apparatus 1 does not perform certifying processing on the recording medium. In this case, if the recording medium is not formatted at all or if no data is recorded on the recording medium, the operation may proceed to the next step without performing any processing to the blank state.

At step S2, system data of a file system is recorded onto the recording medium from a portion having a low logical block address, so as to perform logical formatting. The system data of the file system is, for example, the Volume & File Structure of the file system of Universal Disk Format (UDF: trademark of the Optical Storage Technology Association). If a defective sector is found in the recording medium in recording onto the recording medium, slipping processing is performed to record the physical block address of the defective sector into the system memory.

At this step S2, it is also possible to certify only the system area of the recording medium to perform logical formatting.

At step S3, the moving picture recording apparatus 1 judges whether to start recording of moving picture data or not. The recording of moving picture data is started, for example, as the user of the moving picture recording apparatus 1 presses a recording start button or the like. If the recording is not started, the moving picture recording apparatus 1 temporarily waits at this step S3.

At step S4, recording is started at a portion having a low logical block address in the data area.

At step S5, it is judged whether or not there is any defect in the sectors on which the data is recorded at step S4. Specifically, the defective sector detection circuit 31 judges whether there is any defect or not by detecting the physical block address. When it is judged that there is a defect, the operation proceeds to step S6. When it is judged that there is no defect, the operation proceeds to step S8.

At step S6, slipping processing of the defective sector which is judged to have a defect at step S5 is performed. Specifically, the address control circuit 32 temporarily stops counting of the read address of the RSPC working memory 14 and slips the defective sector part of the recording medium, so as to restart recording at the next defect-free sector.

At step S7, after slipping processing of the defective sector is performed, the defective sector detection circuit 31 supplies the physical block address of the defective sector to the central processing unit 21, which causes the random access memory 24 to store this physical block address. The random access memory 24 stores, in a list, all the physical block addresses of the defective sectors detected during when the moving picture recording apparatus 1 records the moving picture data. On completion of the processing at this step S7, the operation proceeds to step S4 to start re-recording at a physical block address to which the addresses of the slipped defective sectors are added.

At step S8, whether to end recording or not is judged. If all the moving picture data are recorded or if end of recording is commanded, the operation proceeds to step S9 to perform end processing. If all the moving picture data are not recorded and recording of the moving picture data is to be continued, the read address and the physical block address are added by one respectively, and recording is continued sequentially from step S4.

At step S9, recording of moving picture data is stopped, and the list of the physical block addresses of the defective sectors stored until then in the random access memory 24 is recorded on the PDL in the system area of the recording medium. In this case, if the recording medium is not physically formatted at step S1, the disk definition structure (DDS) and SDL are recorded simultaneously.

At step S10, file management information is updated in the system area of the recording medium. For example, in the case of the above-mentioned UDF file system, a file entry is recorded and the Volume & File Structure is updated along with the recording data. On completion of the processing of step S10, the operation of the moving picture recording apparatus 1 ends.

As described above, the moving picture recording apparatus 1 according to the present invention is capable of recording moving picture data onto the recording medium without performing certifying processing. The data recorded on the recording medium has the same format as the data recorded after certifying processing. Also, the moving picture recording apparatus 1 is capable of recording moving pictures on the real-time basis and reproducing the moving pictures from the recording medium on the real-time basis. Therefore, easiness in handling for the user of this moving picture recording apparatus 1 is improved. In addition, since the producer of the recording medium need not perform certifying processing at the time of shipment, reduction in production cost is realized.

Further, since the moving picture recording apparatus 1 according to the present invention does not perform linear replacement processing on the SDL basis, a driving circuit for realizing high-speed seek of the optical head and a control circuit therefor may be simplified, thus enabling reduction in cost.

The moving picture recording apparatus 1 is also capable of additionally recording new moving pictures onto the recording medium on which moving pictures have already been recorded by the moving picture recording apparatus 1. In this case, the moving picture recording medium 1 reads out the physical block address of the defective sector from the PDL which has already been recorded from the recording medium, and stores the physical block address of the defective sector into the random access memory 24 in the control section 20. After that, the moving picture recording apparatus 1 re-records new data. Then, the moving picture recording apparatus 1 additionally stores the physical block address of a defective sector which is newly detected during the re-recording, into the list of defective sectors already stored in the random access memory 24. On completion of recording, the moving picture recording apparatus 1 records the physical block address of the defective sector stored in the random access memory 24 onto all the recording media so as to update the PDL. Thus, the moving picture recording apparatus 1 is capable of performing additional recording also by slipping processing of the defective sector.

In the signal recording apparatus and the signal recording method according to the present invention, sequential data are recorded by performing alternate processing of a defective sector of the recording medium by slipping processing, so that the recording medium need not be certified. Since processing by linear replacement is not performed as the alternate processing of the recording medium, the sequential data may be recorded on the real-time basis. Also, the sequential data recorded on the recording medium by the signal recording apparatus and the signal recording method according to the present invention may be reproduced on the real-time basis.

What is claimed is:

1. A signal recording apparatus for recording sequential data onto a recording medium having a data recording area divided into sectors of predetermined recording units with each sector provided with a physical block address and a management area for managing recorded data, the apparatus comprising:

recording means for dividing the sequential data into units corresponding to the sectors, providing each unit with a logical block address, and recording each unit provided with the logical block address onto the sector of the corresponding physical block address;

defective sector detection means for reading out the physical block address of the sector on which one unit is recorded in recording the one unit of the sequential data by the recording means, then judging whether the read physical block address is correctly read or not, and detecting whether the sector on which the one unit is recorded is a defective sector or not;

address control means for causing the recording means to record the one unit onto the sector of the physical block address read by the defective sector detection means when no defective sector is detected by the defective sector detection means, and for causing the recording means to record the one unit onto the sector of the physical block address next to the physical block address read by the defective sector detection means when the defective sector is detected;

storage means for storing the physical block address of the defective sector when the defective sector is detected by the defective sector detection means; and address recording means for recording the physical block address of the defective sector stored in the storage means into the management area of the recording medium after all the sequential data are recorded onto the recording medium to complete recording.

2. The signal recording apparatus as claimed in claim 1, wherein the recording medium is a digital video disk capable of recording and reproduction.

3. A signal recording method for recording sequential data onto a recording medium having a data recording area divided into sectors of predetermined recording units with each sector provided with a physical block address and a management area for managing recorded data, the method comprising the steps of:

dividing the sequential data into units corresponding to the sectors, providing each unit with a logical block address, reading out the physical block address of the sector on which one unit of the sequential data is recorded in recording each unit provided with the logical block address onto the sector of the corresponding physical block address, judging whether the read physical block address is correctly read or not, and detecting whether the sector on which the one unit is recorded is a defective sector or not;

recording the one unit onto the sector of the correctly read physical block address to continue recording the sequential data when no defective sector is detected, and recording the one unit onto the sector of the next physical block address to continue recording the sequential data when the defective sector is detected; and storing the physical block address of the defective sector when the sector on which the one unit is recorded is the defective sector, and recording the physical block address of the defective sector stored in the storage means into the management area of the recording medium after all the sequential data are recorded onto the recording medium to complete recording.

4. The signal recording method as claimed in claim 3, wherein the sequential data are video data.

* * * * *